(12) United States Patent
Golan et al.

(10) Patent No.: US 10,378,359 B2
(45) Date of Patent: Aug. 13, 2019

(54) HEAT EXCHANGER WITH PRECISION MANUFACTURED FLOW PASSAGES

(71) Applicant: UNITED TECHNOLOGIES CORPORATION, Farmington, CT (US)

(72) Inventors: John W. Golan, Hebron, CT (US); Frederick M. Schwarz, Glastonbury, CT (US)

(73) Assignee: United Technologies Corporation, Farmington, CT (US)

( * ) Notice: Subject to any disclaimer, the term of this patent is extended or adjusted under 35 U.S.C. 154(b) by 558 days.

(21) Appl. No.: 15/156,367

(22) Filed: May 17, 2016

(65) Prior Publication Data
US 2017/0335689 A1    Nov. 23, 2017

(51) Int. Cl.
| | |
|---|---|
| *F01D 25/12* | (2006.01) |
| *F01D 5/08* | (2006.01) |
| *B23P 15/26* | (2006.01) |
| *F01D 5/02* | (2006.01) |
| *F01D 25/24* | (2006.01) |
| *F04D 19/00* | (2006.01) |

(Continued)

(52) U.S. Cl.
CPC ............... *F01D 5/08* (2013.01); *B23P 15/26* (2013.01); *F01D 5/021* (2013.01); *F01D 25/12* (2013.01); *F01D 25/24* (2013.01); *F02C 7/185* (2013.01); *F04D 19/002* (2013.01); *F28D 7/163* (2013.01); *F28D 7/1615* (2013.01); *F28F 1/04* (2013.01); *F28F 7/02* (2013.01); *F28F 13/08* (2013.01); *F05D 2220/32* (2013.01); *F05D 2250/231* (2013.01); *F05D 2260/213* (2013.01); *F28D 2021/0021* (2013.01); *F28D 2021/0026* (2013.01); *F28F 2210/08* (2013.01); *F28F 2250/106* (2013.01); *F28F 2255/14* (2013.01); *F28F 2255/18* (2013.01); *Y02T 50/675* (2013.01)

(58) Field of Classification Search
CPC .. B23P 15/26; F28D 7/00; F28D 21/08; B22F 7/00; F28F 7/02
See application file for complete search history.

(56) References Cited

U.S. PATENT DOCUMENTS

| | | |
|---|---|---|
| 7,203,064 B2 | 4/2007 | Mongia et al. |
| 7,814,966 B2 | 10/2010 | Prior |

(Continued)

FOREIGN PATENT DOCUMENTS

EP    2871433 A1    5/2015

OTHER PUBLICATIONS

European Search Report for European Application No. 17171560.0 dated Oct. 24, 2017.

*Primary Examiner* — Aaron R Eastman
(74) *Attorney, Agent, or Firm* — Carlson, Gaskey & Olds, P.C.

(57) ABSTRACT

A heat exchanger has a first plurality of passages extending in a first direction and to receive a first fluid and a second plurality of passages extending in a second direction, and to receive a second fluid, and the first plurality of passages being formed across a cross-sectional face of the heat exchanger, and there being distinct combined flow cross-sectional areas of the first plurality of passages in different locations across the cross-sectional face of the heat exchanger. A gas turbine engine and a method of forming a heat exchanger are also disclosed.

20 Claims, 3 Drawing Sheets

(51) Int. Cl.
    *F28D 7/16*     (2006.01)
    *F28F 1/04*     (2006.01)
    *F28F 13/08*     (2006.01)
    *F02C 7/18*     (2006.01)
    *F28F 7/02*     (2006.01)
    *F28D 21/00*     (2006.01)

(56) References Cited

U.S. PATENT DOCUMENTS

| | | |
|---|---|---|
| 9,010,130 B2 | 4/2015 | McCormick |
| 9,134,072 B2* | 9/2015 | Roisin ............... B22F 7/002 |
| 2003/0235494 A1 | 12/2003 | Draper |
| 2004/0035562 A1* | 2/2004 | Nishijima ........... F28D 1/0478 |
| | | 165/133 |
| 2008/0296006 A1* | 12/2008 | Manasek ............. F27B 3/065 |
| | | 165/177 |
| 2014/0140829 A1* | 5/2014 | Blair ................. F01D 25/10 |
| | | 415/177 |
| 2016/0076384 A1* | 3/2016 | Snyder ............... F01D 9/02 |
| | | 415/115 |

* cited by examiner

HEAT EXCHANGER WITH PRECISION MANUFACTURED FLOW PASSAGES

BACKGROUND OF THE INVENTION

This application relates to a heat exchanger having a unique arrangement of its flow passages.

Heat exchangers are utilized in any number of applications and serve to cool one fluid typically by exchanging heat with a secondary fluid. Historically, heat exchangers have been formed of flow channels which have a relatively constant cross-section, and which also provide a relatively constant flow area per unit of total area.

One application for a heat exchanger is in a gas turbine engine. In gas turbine engines, a fan delivers air into a compressor and into a bypass duct as propulsion air. The air from the compressor is compressed and delivered into a combustor where it is mixed with fuel and ignited. Products of this combustion pass downstream over turbine rotors, driving them to rotate.

The turbine section becomes quite hot and, thus, it is known to provide cooling air to the turbine section.

With recent advances in gas turbine engines, the turbine is exposed to hotter temperatures. Further, the turbine is exposed to higher pressures than in the past.

Thus, the cooling air being supplied to the turbine must also have a corresponding increase in pressure. However, when a higher pressure air is tapped from the compressor, the temperature also increases.

Thus, the cooling air must be cooled in a heat exchanger before being delivered to the turbine section. Known heat exchangers face challenges in providing adequate cooling.

SUMMARY OF THE INVENTION

In a featured embodiment, a heat exchanger has a first plurality of passages extending in a first direction and to receive a first fluid and a second plurality of passages extending in a second direction, and to receive a second fluid, and the first plurality of passages being formed across a cross-sectional face of the heat exchanger, and there being distinct combined flow cross-sectional areas of the first plurality of passages in different locations across the cross-sectional face of the heat exchanger.

In another embodiment according to the previous embodiment, the first and second directions are generally perpendicular to each other.

In another embodiment according to any of the previous embodiments, a corner is defined at an upstream end of the first set of passages and the second set of passages, and the flow cross-sectional area of the first and second passages being less adjacent the corner than at locations spaced from the corner.

In another embodiment according to any of the previous embodiments, a shape of the first flow passages adjacent the corner is distinct from a shape of the passages spaced from the corner.

In another embodiment according to any of the previous embodiments, a cross-sectional area of the passages in the first plurality of passages adjacent to the corner is less than a cross-sectional area of the passages in the first plurality of passages spaced further from the corner.

In another embodiment according to any of the previous embodiments, the passages in the first plurality of passages spaced from the corner include a polygonal shape.

In another embodiment according to any of the previous embodiments, the passages in the first set of passages adjacent the corner having a cylindrical shape.

In another embodiment according to any of the previous embodiments, a cross-sectional area of the passages in the first plurality of passages adjacent to the corner is less than a cross-sectional area of the passages in the first plurality of passages spaced further from the corner.

In another embodiment according to any of the previous embodiments, the second plurality of passages being formed across a cross-sectional face of the heat exchanger and there also being distinct combined flow cross-sectional areas of the second plurality of passages in different locations across the cross-sectional face of the heat exchanger.

In another featured embodiment, a gas turbine engine has a compressor and a turbine section. A heat exchanger cools air delivered to the turbine section for cooling components in the turbine section, the heat exchanger including a first plurality of passages extending in a first direction and to receive a first fluid and a second plurality of passages extending in a second direction, and to receive a second fluid, and the first plurality of passages being formed across a cross-sectional face of the heat exchanger, and there being distinct combined flow cross-sectional areas of the first cooling passages in different locations across the cross-sectional face of the heat exchanger.

In another embodiment according to the previous embodiment, the first and second directions are generally perpendicular to each other.

In another embodiment according to any of the previous embodiments, a corner is defined at an upstream end of the first set of passages and the second set of passages, and the combined flow cross-sectional area of the first and second passages being less adjacent the corner than at locations spaced from the corner.

In another embodiment according to any of the previous embodiments, a shape of the first flow passages adjacent the corner is distinct from a shape of the passages spaced from the corner.

In another embodiment according to any of the previous embodiments, a cross-sectional area of the passages in the first set of passages adjacent to the corner is less than a cross-sectional area of the passages and the first set of passages spaced further from the corner.

In another embodiment according to any of the previous embodiments, the passages in the first plurality of passages spaced from the corner include a polygonal shape.

In another embodiment according to any of the previous embodiments, the passages in the first set of passages adjacent the corner having a cylindrical shape.

In another embodiment according to any of the previous embodiments, the second plurality of passages being formed across a cross-sectional face of the heat exchanger and there being distinct combined flow cross-sectional areas of the second plurality of passages in different locations across the cross-sectional face of the heat exchanger.

In another featured embodiment, a method of forming a heat exchanger includes forming a first plurality of passages extending in a first direction and to receive a first fluid and forming a second plurality of passages extending in a second direction, and to receive a second fluid, and the first plurality of passages being formed across a cross-sectional face of the heat exchanger, and there being distinct combined flow cross-sectional areas of the first cooling passages in different locations across the cross-sectional face of the heat exchanger.

In another embodiment according to the previous embodiment, the first and second plurality of passages are formed utilizing refractory metal cores.

In another embodiment according to any of the previous embodiments, the heat exchanger is formed using an additive manufacturing process.

These and other features may be best understood from the following drawings and specification.

DETAILED DESCRIPTION

Figure 1:
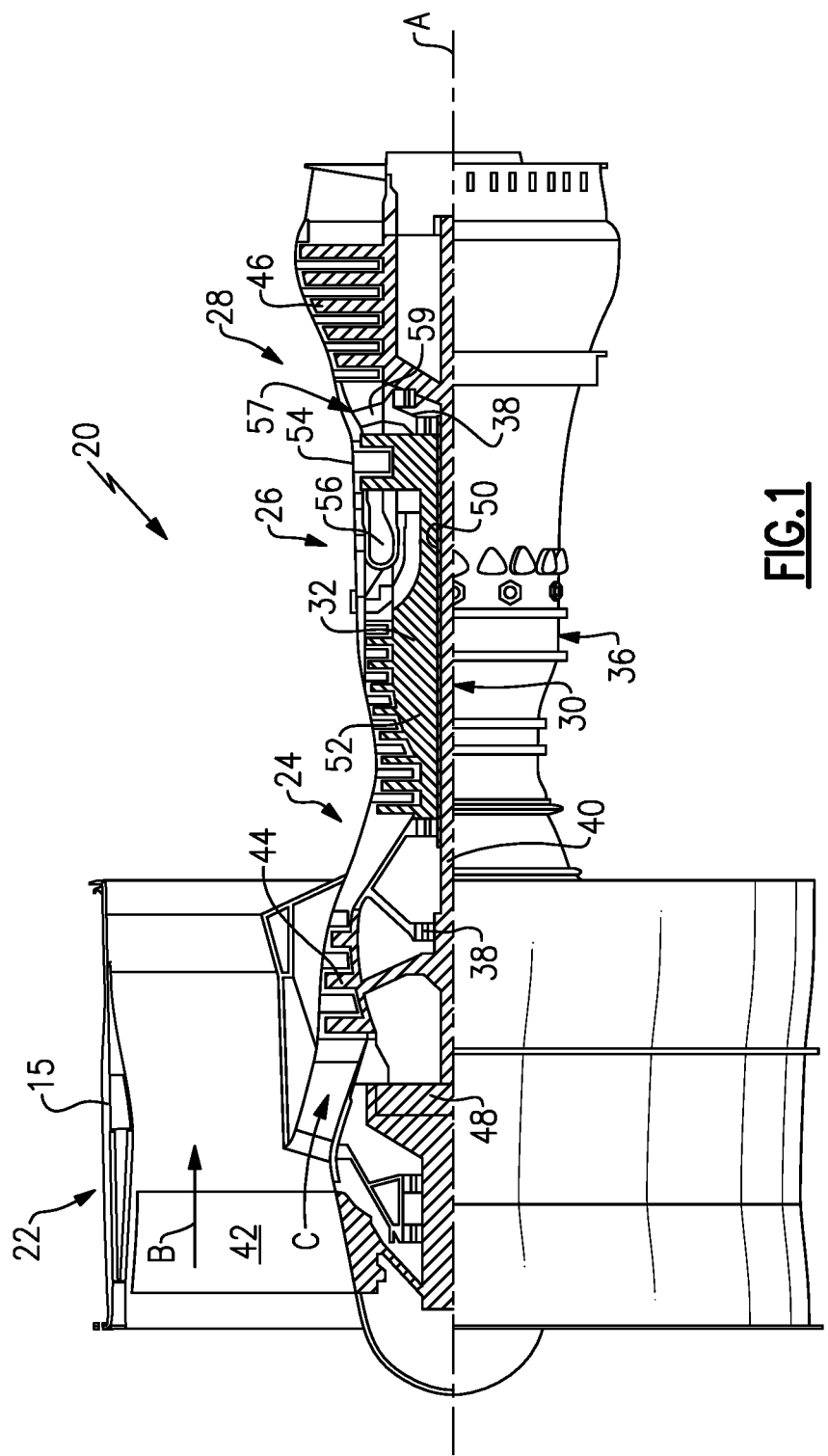
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7\ °R)]^{0.5}$. The "Low corrected fan tip speed" as disclosed herein according to one non-limiting embodiment is less than about 1150 ft/second (350.5 meters/second).

Figure 2:
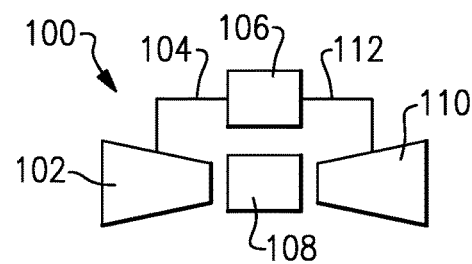
FIG. 2 is a highly schematic view of a cooling flow in a gas turbine engine.

FIG. 2 schematically shows an engine 100 having a compressor 102 delivering cooling air into line 104 which passes through a heat exchanger 106, and to the turbine section 110 through a line 112. As known, a combustor 108 is intermediate the compressor 102 and turbine section 110.

The heat exchanger 106 may sit in the bypass duct, such as shown in the FIG. 1 engine 20. Alternatively, the heat exchanger could be placed in other locations.

As mentioned above, it is desirable to cool the compressed air being delivered to the turbine section as cooling air in the heat exchanger 106, however, known heat exchangers have difficulty achieving sufficient cooling. In addition, known heat exchangers face challenges and, in particular, with regard to stresses that are placed on particular areas of the heat exchanger through thermal gradients.

Figure 3A:
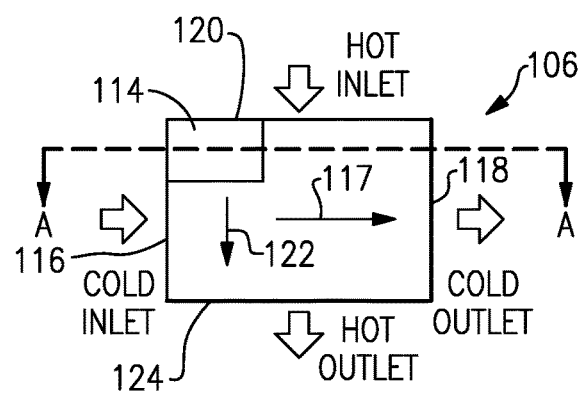
FIG. 3A schematically shows a heat exchanger embodiment.

FIG. 3A shows a heat exchanger 106. As shown, an area 114 may be defined adjacent a most extreme portion of the heat exchanger wherein a cool inlet 116 is entering the heat exchanger and moving through passages 117 to a cooling fluid outlet 118. Crossing across the flow path 117 is a hot inlet 120 leading to hot air passages 122 into the outlet 124. In the arrangement shown in FIG. 2, it is the air in lines 104 and 112 which is entering at 120 and leaving at 124. It may be the bypass air or other cooling air which enters inlet 116 and leaves outlet 118.

The section 114 formed at the edges or corner of the heat exchanger 106 sees the greatest difference between the high temperature of the hot inlet and the low temperature of the cool inlet 116. This is because they are both at their most upstream positions. Thus, the stresses in the area 114 are at the highest across the entire heat exchanger 106. It should be understood that the fluid flows along the entire surface faces of heat exchanger 106. However, this application focuses on section 114.

Figure 3B:
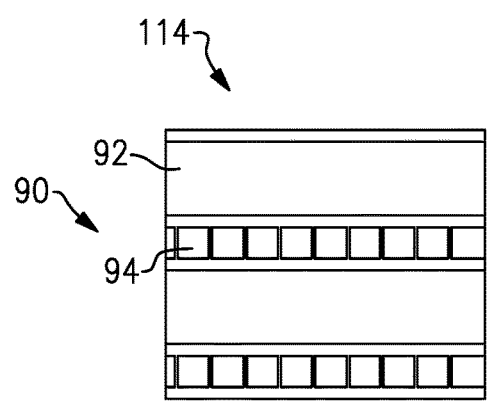
FIG. 3B shows a portion of FIG. 3A in the prior art.

FIG. 3B shows a prior art heat exchanger. The cooling passages 92 are of a relatively constant cross-section, as are the passages 94 receiving the hot air to be cooled. Traditional heat exchangers have been manufactured utilizing constant cross-sectional areas, sizes, and shapes. In addition, the cross-sectional area of the passages has been relatively constant across the entire area of the heat exchanger.

Figure 4A:
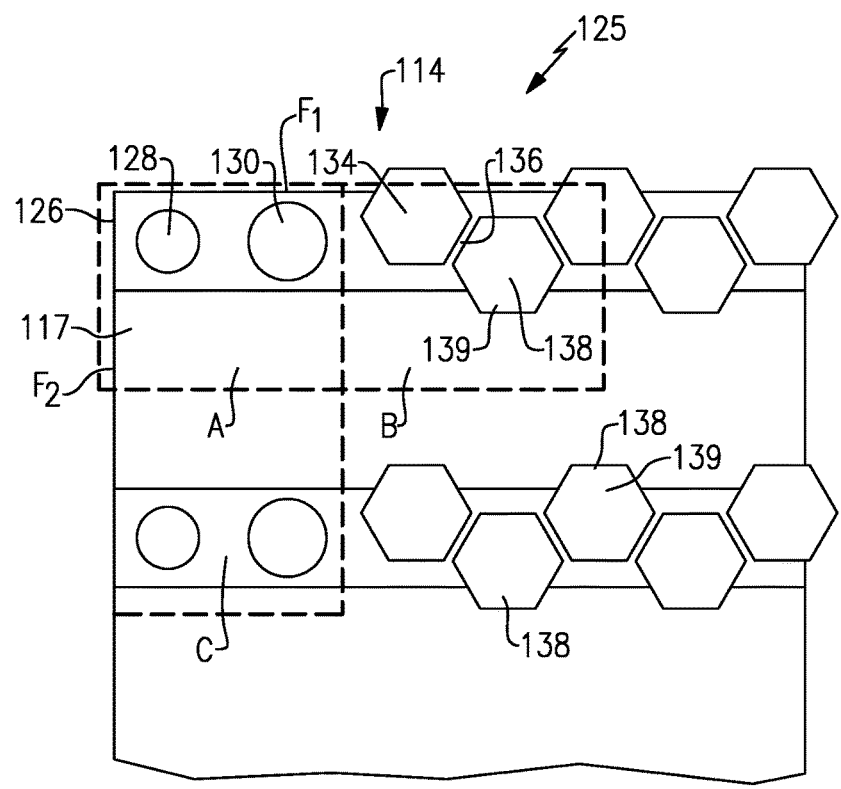
FIG. 4A shows a disclosed heat exchanger at the same portion of FIG. 3B.

FIG. 4A shows a heat exchanger 125 and, in particular, the corner 114 as set forth in FIG. 3A. As shown, adjacent the corner 126 discussed above, there is a very small passage 128 and then a somewhat larger passage 130. The passages 128 and 130 are formed to be circular in cross-section. Moving further from the corner 126, the passages 134 can be formed to be hexagonal or other polygonal or other shapes. As can be appreciated, there is a good deal more flow cross-sectional area in the passages 134 than in passages 128 and 130. As shown, the wall 136 between adjacent passages 134 and 130 is relatively small and, thus, there is a greater flow area than closer to the corner 126. In addition, the specific shape may be designed and tailored to maximize the efficiency of the heat exchanger.

As also shown, ends 139 of the passages 138 may extend into the cooling flow passages 117. Although not clear from this figure, the passages 117 would also include a plurality of spaced passages, and smaller passages, and a lower cross-sectional area of passages adjacent to corner 126. That is, the passages 117 might look much like the passages 128, 130, 134, and 138.

In the heat exchanger of FIG. 4A, a first plurality of passages could be said to extend in a first direction and to receive a first fluid and a second plurality of passages extending in a second direction, and to receive a second fluid. The first plurality of passages is formed across a cross-sectional face $F_1$ of the heat exchanger, and there being distinct combined flow cross-sectional areas of the first plurality of passages in different locations A/B across the cross-sectional face of the heat exchanger. The corner 126 is defined at an upstream end of the first set of passages and the second set of passages, and the combined flow cross-sectional areas of the first and second passages are less adjacent the corner than at locations spaced from the corner.

Figure 4B:
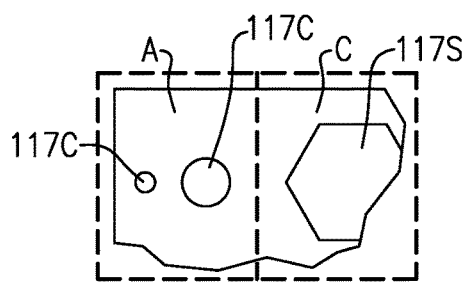
FIG. 4B shows another detail of the heat exchanger embodiment of FIGS. 3A-3B, 4A-4B.

As shown in FIG. 4B, a second plurality of passages 117 is formed across a cross-sectional face $F_2$ of the heat exchanger and there being distinct combined flow cross-sectional areas 117C/117S of the second plurality of passages in different locations A/C across the cross-sectional face of the heat exchanger. As is clear, again closer to corner 126 there is less combined flow cross-sectional area.

Stated another way, the first plurality of passages have a first upstream end and a first downstream end spaced in a first direction and the second plurality of passage have a second upstream end and a second downstream end spaced in a second direction. The first plurality of passages have a lesser cross-sectional area adjacent the second upstream end per unit area than the cross-sectional area of the first plurality of passages closer to the second downstream end. The opposite is true of the second plurality of passages which have a lesser cross-sectional area per unit area adjacent the first upstream end than they do adjacent the first downstream end.

A fluid diameter of the passages in the passages adjacent to the corner is also less than a fluid diameter of the passages spaced further from the corner.

The heat exchanger 125 may be formed by precision casting techniques. As an example, a casting technique known as investment casting of refractory metal core may be utilized. Tungsten and other refractory metals may be utilized in a so-called lost metal technique to form the internal passages.

Thus, the complex shapes and inter-fitting flow passages, as disclosed above, may be achieved with this method.

Figure 5:
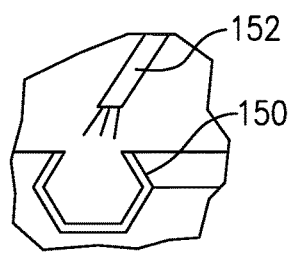
FIG. 5 shows a manufacturing step.

An alternative manufacturing method is shown schematically in FIG. 5. FIG. 5 schematically shows an additive manufacturing technique wherein an intermediate portion 150 of a flow passage is being formed by an additive manufacturing tool 152. As known, additive manufacturing builds up a part by placing material down in layers. Additive manufacturing is able to make very complex shapes.

Any type of additive manufacturing process may be utilized. A worker of ordinary skill in the art would be able to select an appropriate known additive manufacturing process based upon the goals of this disclosure.

Thus, utilizing precision casting or additive manufacturing techniques, a worker of ordinary skill in the art would be able to achieve specific arrangements of inter-fitting flow passages as desired for a particular heat exchanger application.

The arrangement shown in FIG. 3A is a so-called cross-flow heat exchanger wherein the two fluids cross each other and along generally perpendicular directions.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A heat exchanger comprising:
   a first plurality of passages extending in a first direction, with there being a first upstream end spaced from a first downstream end in the first direction and to receive a first fluid and a second plurality of passages extending in a second direction with there being a second upstream end spaced from a second downstream end in the second direction, and to receive a second fluid, and said first plurality of passages being formed across a cross-sectional face of the heat exchanger, and there being distinct combined flow cross-sectional areas of said first plurality of passages in different locations across said cross-sectional face of said heat exchanger; and said first plurality of passages having a lesser combined flow cross-sectional area at locations adjacent said second upstream end than said first plurality of passages combined flow cross-sectional area adjacent said second downstream end and said second plurality of passages having a lesser combined flow cross-sectional area adjacent said first upstream end than said second plurality of passages combined flow cross-sectional area adjacent said first downstream end.

2. The heat exchanger as set forth in claim 1, wherein said first and second directions are perpendicular to each other.

3. The heat exchanger as set forth in claim 1, wherein a corner is defined at said first upstream end and said second upstream end, and said combined flow cross-sectional area of said first and second plurality of passages being less adjacent said corner than at locations spaced from said corner.

4. The heat exchanger as set forth in claim 3, wherein a shape of said first plurality of passages adjacent said corner are distinct from a shape of said first plurality of passages spaced from said corner.

5. The heat exchanger as set forth in claim 4, wherein a cross-sectional area of said shape of said first plurality of passages adjacent to said corner is less than a cross-sectional area of said shape of said first plurality of passages spaced further from said corner.

6. The heat exchanger as set forth in claim 5, wherein said shape of said first plurality of passages spaced from said corner include a polygonal shape.

7. The heat exchanger as set forth in claim 6, wherein said shape of said first plurality of passages adjacent said corner have a cylindrical shape.

8. The heat exchanger as set forth in claim 3, wherein a cross-B sectional area of said shape of said first plurality of passages adjacent to said corner is less than a cross-sectional area of said shape of said first plurality of passages spaced further from said corner.

9. The heat exchanger as set forth in claim 1, wherein said second plurality of passages being formed across a cross-sectional face of the heat exchanger and there also being distinct combined flow cross-sectional areas of said second plurality of passages in different locations across said cross-sectional face of said heat exchanger.

10. A gas turbine engine comprising:
a compressor and a turbine section; and
a heat exchanger to cool air being delivered to said turbine section for cooling components in said turbine section, the heat exchanger including a first plurality of passages extending in a first direction, with there being a first upstream end spaced from a first downstream end in the first direction and to receive a first fluid and a second plurality of passages extending in a second direction with there being a second upstream end spaced from a second downstream end in the second direction, and to receive a second fluid, and said first plurality of passages being formed across a cross-sectional face of the heat exchanger, and there being distinct combined flow cross-sectional areas of said first plurality of passages in different locations across said cross-sectional face of said heat exchanger; and
said first plurality of passage having a lesser combined flow cross-sectional area at locations adjacent said second upstream end than said first plurality of passages combined flow cross-sectional area adjacent said second downstream end and said second plurality of passages having a lesser combined flow cross-sectional area adjacent said first upstream end than said second plurality of passages combined flow cross-sectional area adjacent said first downstream end.

11. The gas turbine engine as set forth in claim 10, wherein said first and second directions are perpendicular to each other.

12. The gas turbine engine as set forth in claim 10, wherein a B corner is defined at said first upstream end and said second upstream end, and said combined flow cross-sectional area of said first and second plurality of passages being less adjacent said corner than at locations spaced from said corner.

13. The gas turbine engine as set forth in claim 12, wherein a shape of said first plurality of passages adjacent said corner are distinct from a shape of said first plurality of passages spaced from said corner.

14. The gas turbine engine as set forth in claim 12, wherein a cross-sectional area of said shape of said first set of passages adjacent to said corner is less than a cross-sectional area of said shape of said first set of passages spaced further from said corner.

15. The gas turbine engine as set forth in claim 14, wherein said shape of said first plurality of passages spaced from said corner include a polygonal shape.

16. The gas turbine engine as set forth in claim 15, wherein said shape of said first plurality of passages adjacent said corner have a cylindrical shape.

17. The gas turbine engine as set forth in claim 10, wherein said second plurality of passages being formed across a cross-sectional face of the heat exchanger and there being distinct combined flow cross-sectional areas of said second plurality of passages in different locations across said cross-sectional face of said heat exchanger.

18. A method of forming a heat exchanger comprising:
forming a first plurality of passages extending in a first direction, with there being a first upstream end spaced from a first downstream end in the first direction and to receive a first fluid and forming a second plurality of passages extending in a second direction with there being a second upstream end spaced from a second downstream end in the second direction, and to receive a second fluid, and said first plurality of passages being formed across a cross-sectional face of the heat exchanger, and there being distinct combined flow cross-sectional areas of said first cooling passages in different locations across said cross-sectional face of said heat exchanger, and
said first plurality of passages having a lesser combined flow cross-sectional area at locations adjacent said second upstream end than said first plurality of passages combined flow cross-sectional area adjacent said second downstream end and said second plurality of passages having a lesser combined flow cross-sectional area adjacent said first upstream end than said second plurality of passages combined flow cross-sectional area adjacent said first downstream end.

19. The method as set forth in claim 18, wherein said first and second plurality of passages are formed utilizing refractory metal cores.

20. The method as set forth in claim 18, wherein said heat exchanger is formed using an additive manufacturing process.

* * * * *